(12) United States Patent
Katayama et al.

(10) Patent No.: US 7,161,631 B2
(45) Date of Patent: Jan. 9, 2007

(54) DIGITAL BROADCAST RECEIVING APPARATUS

(75) Inventors: Takahiro Katayama, Osaka (JP); Manabu Yamamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 614 days.

(21) Appl. No.: 10/629,111

(22) Filed: Jul. 29, 2003

(65) Prior Publication Data
US 2004/0036801 A1    Feb. 26, 2004

(30) Foreign Application Priority Data
Aug. 22, 2002  (JP) .......................... P2002-241562

(51) Int. Cl.
*H04N 7/00*     (2006.01)
*H04N 9/74*     (2006.01)
*H04N 5/445*    (2006.01)

(52) U.S. Cl. .................. 348/468; 348/569; 348/589; 348/600

(58) Field of Classification Search ............. 348/465, 348/468, 553, 578, 584, 589, 594, 595, 598–600, 348/569, 478, 563–565; 725/37, 38, 137; *H04N 7/00, H04N 7/087, 9/74, 9/76, 5/445*
See application file for complete search history.

(56) References Cited

U.S. PATENT DOCUMENTS

| | | | | |
|---|---|---|---|---|
| 5,327,176 A | * | 7/1994 | Forler et al. ................ | 348/564 |
| 5,959,687 A | * | 9/1999 | Dinwiddie et al. ......... | 348/564 |
| 6,678,008 B1 | * | 1/2004 | Winter ....................... | 348/565 |
| 6,903,779 B1 | * | 6/2005 | Dyer .......................... | 348/465 |

FOREIGN PATENT DOCUMENTS

| | | |
|---|---|---|
| JP | 9-107529 | 4/1997 |
| JP | 2001-326870 | 11/2001 |

OTHER PUBLICATIONS

Patent Abstracts of Japan No.: 09-107529, dated Apr. 22, 1997 (1 page).
Patent Abstracts of Japan No.: 2001-326870, dated Nov. 22, 2001 (1 page).

* cited by examiner

*Primary Examiner*—Sherrie Hsia
(74) *Attorney, Agent, or Firm*—Osha Liang LLP

(57) ABSTRACT

When a viewer does not make a request for displaying a menu screen, a CPU inserts a closed caption signal into LINE 21 of a video signal and outputs the video signal to an analog television receiver. When the viewer changes the setting of the apparatus, the CPU performs so as to output a menu image, to generate a closed caption erase signal, and to insert the closed caption erase signal into LINE 21 of the video signal. Thereafter, output of the menu image is continued until the menu erase signal is received or reception of digital broadcast signal is terminated and in the meanwhile, the closed caption signal is not output.

2 Claims, 5 Drawing Sheets

FIG. 3

|   | CODE 1 | CODE 2 | DESCRIPTION |
|---|---|---|---|
| 1 | 0 x 14 | 0 x 2C | ERASING OF DISPLAY MEMORY OF DATA CHANNEL 1 |
| 2 | 0 x 14 | 0 x 2C | |
| 3 | 0 x 1C | 0 x 2C | ERASING OF DISPLAY MEMORY OF DATA CHANNEL 2 |
| 4 | 0 x 1C | 0 x 2C | |
| 5 | 0 x 14 | 0 x 2E | ERASING OF NON-DISPLAY MEMORY OF DATA CHANNEL 1 |
| 6 | 0 x 14 | 0 x 2E | |
| 7 | 0 x 1C | 0 x 2E | ERASING OF NON-DISPLAY MEMORY OF DATA CHANNEL 2 |
| 8 | 0 x 1C | 0 x 2E | |

DIGITAL BROADCAST RECEIVING APPARATUS

BACKGROUND OF THE INVENTION

1. Field of the Invention

The present invention relates to a digital broadcast receiving apparatus for receiving a digital broadcast signal and outputting an analog video signal and an analog audio signal and in particular to a digital broadcast receiving apparatus for multiplexing a closed caption provided from a digital broadcast signal in a video signal and outputting the multiplexed signal.

2. Description of the Related Art

A digital broadcast receiving apparatus in a related art receives a digital broadcast signal of a selected channel, converts the digital broadcast signal into an analog video signal and an analog audio signal, and outputs the analog video signal and the analog audio signal to an analog display such as a television receiver. When an analog broadcast closed caption is contained in the digital broadcast signal, in converting the received digital broadcast signal into analog form, a closed caption signal for analog broadcast (an analog broadcast closed caption signal) is extracted.

Inserting the analog broadcast closed caption signal in the 21st scanning line (LINE 21) of a video signal is standardized in EIA (Electronic Industries Association)-608, and up to four closed captions 1 to 4 (CC1 to CC4) can be broadcast. Thus, the extracted closed caption signal is inserted in LINE 21 of a video signal and the multiplexed video signal is output to the display. Based on the video signal, the display displays program video on a screen and also displays a closed caption of a text broadcast on the screen, as shown in FIG. 5. FIG. 5 is a schematic drawing to show a state in which program video and the closed caption are displayed on the screen of the display. Program video is displayed on the whole of a display screen 100 of a display 30 and a closed caption 101 is displayed in a predetermined range near the lower end of the display screen 100 so that it is superposed on the program video.

The digital broadcast receiving apparatus has a function of outputting a menu image to the display so that the user can change the setup description of the apparatus main unit and easily visually check the setup description. The menu image is stored in memory and when the viewer performs setting change operation, the menu image is superposed on a video signal for output. The display displays the video signal containing the menu image on the screen, whereby a setting change menu screen as shown in FIG. 6 is displayed. FIG. 6 is a schematic drawing to show a state in which program video and the menu screen are displayed on the screen of the display. Program video is displayed on the whole display screen 100 of the display 30 and a menu screen 102 is displayed in a predetermined width from the center of the display screen 100 to the upper and lower ends thereof so that it is superposed on the program video.

In the digital broadcast receiving apparatus in the related art, however, if a closed caption signal is inserted into the video signal containing a menu image, the closed caption 101 and the menu screen 102 may overlap each other on the screen 100 of the display 30 as shown in FIG. 7 (overlap portion 110 in the figure). If the closed caption 101 and the menu screen 102 overlap each other, it becomes hard for the viewer to see the menu screen 102 and the closed caption 101.

Hitherto, various arts for the digital broadcast receiving apparatus have been proposed including those disclosed in Japanese unexamined patent publications JP-A-9-107529 and JP-A-2001-326870. However, a method of solving the problem described above is not disclosed in neither of the publications.

SUMMARY OF THE INVENTION

It is therefore an object of the invention to provide a digital broadcast receiving apparatus for preventing a menu screen for setting an operation environment of an apparatus main unit and a closed caption from overlapping each other.

In order to achieve the above object of the invention, according to a first aspect of the invention, there is provided a digital broadcast receiving apparatus including: a receive section adapted to receive a digital broadcast signal of a selected channel; a convert section adapted to convert the digital broadcast signal into a video signal of an analog mode and to extract a closed caption signal from the digital broadcast signal; a multiplex section adapted to multiplex the closed caption signal in the video signal and to output the video signal in which the closed caption signal is multiplexed; and a control section adapted to control a superpose process of a configuration menu image, wherein when the configuration menu image is superposed on the video signal, the control section prohibits inserting the closed caption signal in a predetermined scanning line of the video signal, thereby limiting multiplexing of the closed caption signal in the video signal.

According to the first aspect of the invention, while the menu image signal is output, the closed caption signal is not output, so that no closed caption is displayed on the display screen and only program video and a menu screen are displayed.

According to a second aspect of the invention, in addition to the first aspect of the invention, the control section inserts an erase signal for erasing a previously output closed caption into the predetermined scanning line of the video signal.

According to the second aspect of the invention, the erase signal is multiplexed in the video signal for output, whereby the closed caption already displayed on the display screen is erased.

BRIEF DESCRIPTION OF THE DRAWINGS

The above objects and advantages of the present invention will become more apparent by describing preferred exemplary embodiment thereof in detail with reference to the accompanying drawings, wherein:

FIG. 3 is a drawing to show the description of an erase signal;

DETAILED DESCRIPTION OF THE PREFERRED EMBODIMENTS

A digital broadcast receiving apparatus according to a preferred embodiment of the invention will be discussed hereinafter with reference to the accompanying drawings.

Figure 1:
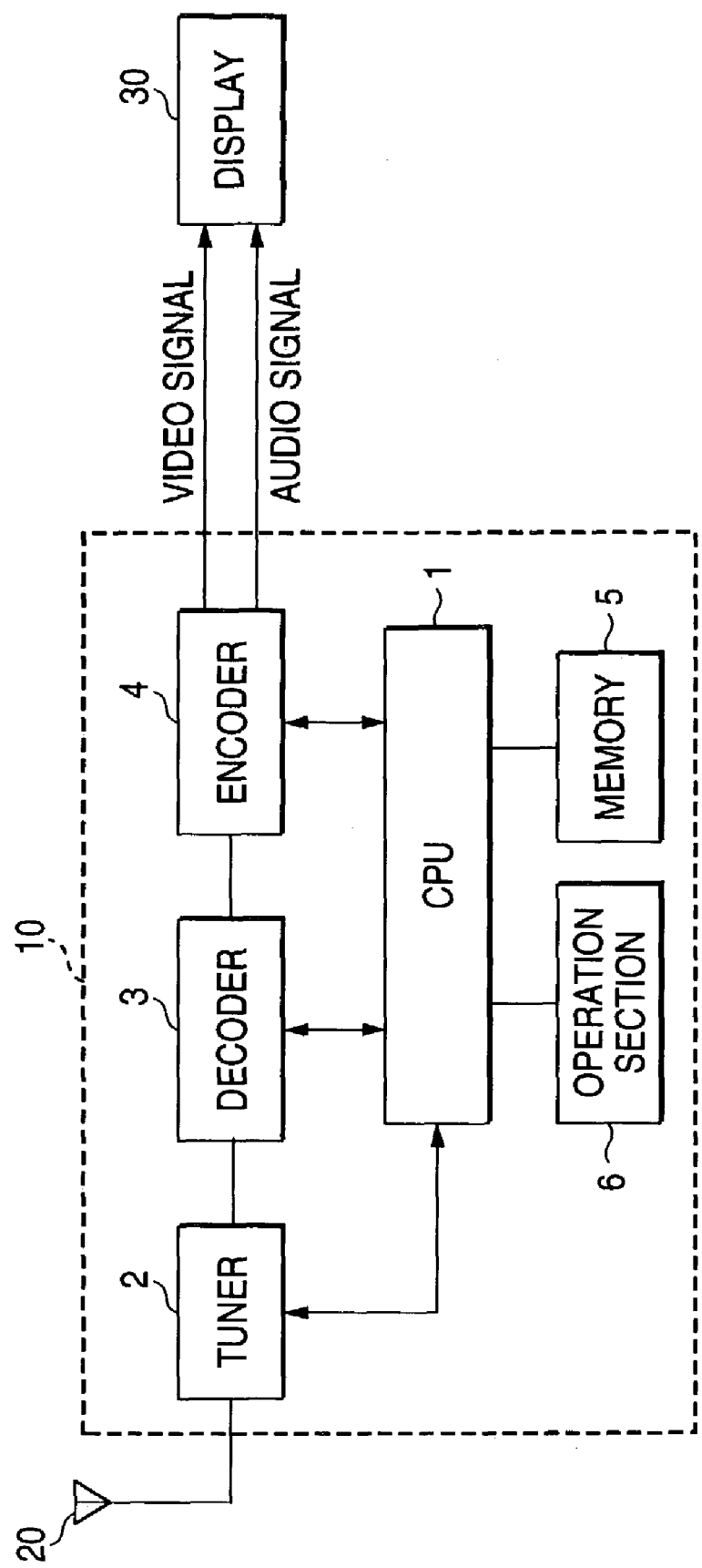
FIG. 1 is a block diagram to show a main part of a digital broadcast receiving apparatus according to an embodiment of the invention.

FIG. 1 is a block diagram to show a main part of a digital broadcast receiving apparatus according to the embodiment.

A digital broadcast receiving apparatus 10 includes a CPU 1 corresponding to control section of the invention, a memory 5 connected to the CPU 1 (control section), a tuner 2 (receive section) connected to an antenna 20, a decoder 3 (convert section) for converting a digital signal into an analog signal, an encoder 4 (multiplex section) for performing predetermined processing for the analog signal, and operation section 6 for a viewer to input a setting of the digital broadcast receiving apparatus 10 itself (apparatus main unit). A display 30 is connected to the encoder 4 and displays a closed caption (text information) on a display screen based on a closed caption signal inserted in the 21st scanning line (LINE 21) of a video signal.

A digital broadcast signal received at the antenna 20 is input to the tuner 2, which then extracts the digital signal of the channel selected by the viewer through the operation section 6 and outputs the digital signal to the decoder 3. The decoder 3 decodes the input digital signal to generate the analog video signal, the analog audio signal, and an analog broadcast closed caption signal. The video signal and the audio signal generated by the decoder 3 are input to the encoder 4.

The closed caption signal generated by the decoder 3 is input to the CPU 1 and is stored in the memory 5. The CPU 1 outputs the closed caption signal stored in the memory 5 to the encoder 4, which then inserts the closed caption signal into LINE 21 of the video signal and outputs the audio signal and the video signal with LINE 21 in which the closed caption signal is inserted to the analog display 30 such as an analog television receiver. The display 30 displays program video on a screen based on the input video signal, displays a closed caption in a predetermined range on the screen, and outputs audio from predetermined audio output section based on the audio signal.

In changing the setting of the apparatus main unit, the viewer operates the operation section 6, whereby the operation section 6 generates a setting change signal. The setting change signal is input to the CPU 1, which then reads a setting change menu image or a configuration menu image (simply, a menu image) stored in the memory 5 and outputs the menu image to the encoder 4. The encoder 4 superposes the menu image on the video signal and outputs to the display 30. The display 30 displays a menu screen at a predetermined position on the screen based on the menu image superposed on the video signal.

When outputting the menu image, the CPU 1 performs so as not to output the closed caption signal, whereby only program video and the menu screen are displayed on the screen of the display 30 and no closed caption is displayed.

Hereinafter, a flow of displaying either the closed caption or the menu screen will be discussed.

Figure 2:
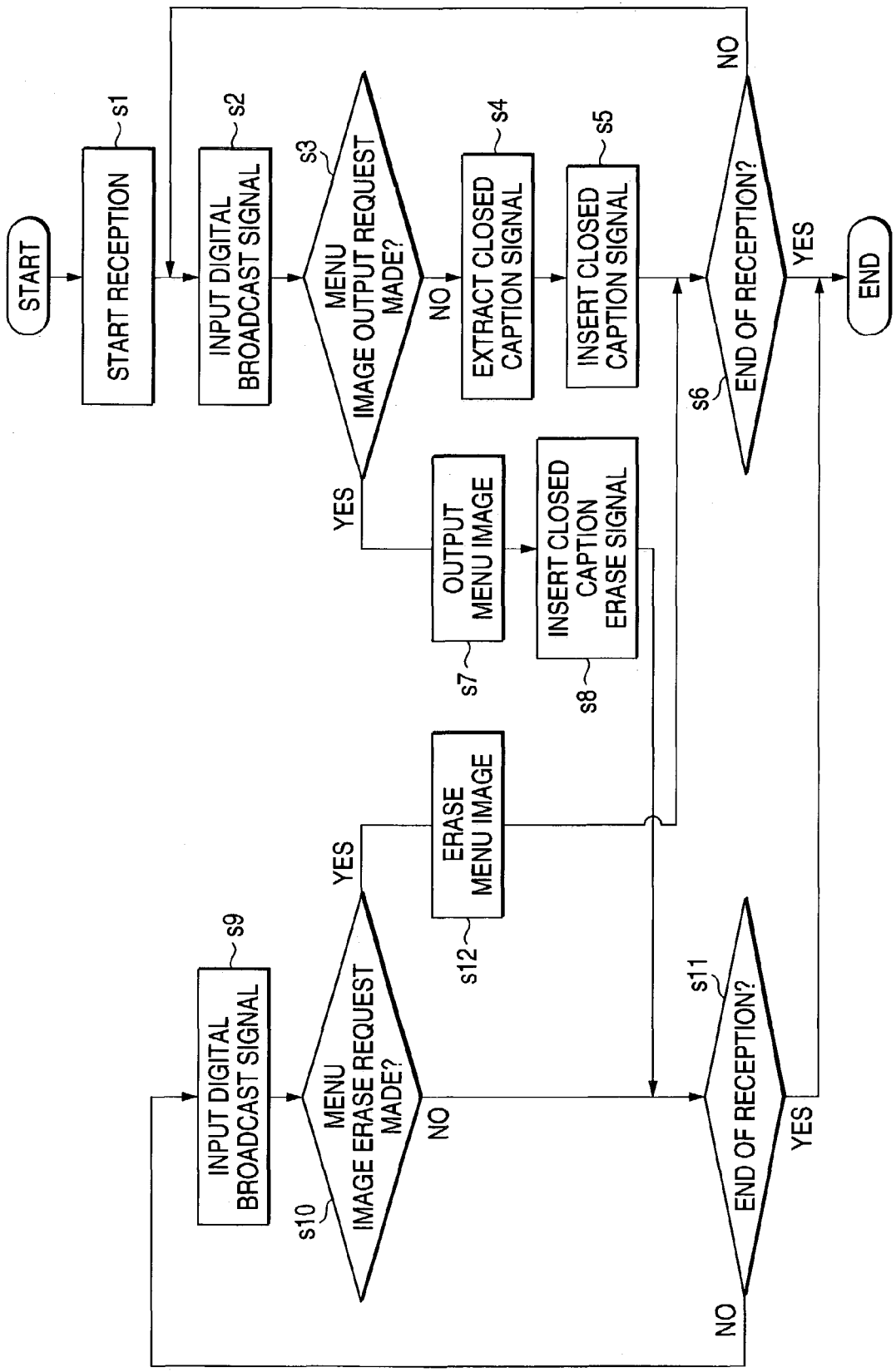
FIG. 2 is a flowchart to show a flow to display a menu screen or a closed caption.

FIG. 2 is a flowchart to show a flow to display the menu screen or the closed caption.

When the power of the digital broadcast receiving apparatus 10 is turned on, reception of the digital broadcast signal of the selected channel is started and the digital broadcast signal is input (steps from S1 to S2). When the viewer does not make a request for displaying the menu screen, the CPU 1 extracts the closed caption signal from the digital broadcast signal, stores the closed caption signal in the memory 5, and inserts the stored closed caption signal into LINE 21 of the video signal, and the encoder 4 outputs to the display 30 (steps S3 through S5 via s4). When the viewer does not perform reception termination operation (such as turning off the power), digital broadcast signals input in order are decoded in order and output of the video signal, the audio signal, and the closed caption signal is continued (steps from S6 to S2).

When the viewer operates the operation section 6 and the operation section 6 generates the setting change signal, the CPU 1 outputs the menu image (steps from S3 to S7). The CPU 1 generates a closed caption erase signal as shown in FIG. 3 and inserts the closed caption erase signal into LINE 21 of the video signal (step S8). Accordingly, the closed caption displayed on the screen of the display 30 is erased. The output of the video signal containing the menu image is continued until the menu screen erase signal is received or reception is terminated. Meanwhile, the closed caption signal is not inserted into the video signal. (steps from S11 to S10 via S9) When the menu operation termination signal is generated through the operation section 6, the CPU 1 stops outputting the menu image (steps from S10 to S12).

The closed caption erase signal includes eight pairs of code signal as shown in FIG. 3 and the eight pairs of codes are inserted into odd-numbered fields (odd-numbered scanning lines) and even-numbered fields (even-numbered scanning lines) of the video signal, whereby the closed captions displayed on the screen of the display 30 are erased.

In the table in FIG. 3, a data channel 1 indicates closed caption 1 (CC1) at the odd-numbered field scanning time and closed caption 3 (CC3) at the even-numbered field scanning time, and a data channel 2 indicates closed caption 2 (CC2) at the odd-numbered field scanning time and closed caption 4 (CC4) at the even-numbered field scanning time. By way of example, a code for erasing the closed captions 1 and 2 (CC1, CC2) is 0×14, a code for erasing closed captions 3 and 4 (CC3, CC4) is 0×1C, a code for erasing the closed caption stored in display memory is 0×2C, and a code for erasing the closed caption stored in non-display memory is 0×2E. The codes 1 and 2 are inserted into the video signal twice successively, whereby the erase signal is made effective.

First, 0×14 as code 1 and 0×2C as code 2 are inserted into LINE 21 twice successively, whereby the closed captions 1 and 2 (CC1, CC2) stored in the display memory of the display 30 are erased. That is, the closed captions 1 and 2 (CC1, CC2) displayed at present are erased from the screen.

Next, 0×1C as code 1 and 0×2C as code 2 are inserted into LINE 21 twice successively, whereby the closed captions 3 and 4 (CC3, CC4) stored in the display memory of the display 30 are erased. That is, the closed captions 3 and 4 (CC3, CC4) displayed at present are erased from the screen.

Next, 0×14 as code 1 and 0×2E as code 2 are inserted into LINE 21 twice successively, whereby the closed captions 1 and 2 (CC1, CC2) stored in the non-display memory of the display 30 are erased. That is, the closed captions 1 and 2 (CC1, CC2) to be next displayed are erased and no closed caption is output from the non-display memory to the display memory. Accordingly, the closed captions 1 and 2 (CC1, CC2) are not displayed on the screen.

Next, 0×1C as code 1 and 0×2E as code 2 are inserted into LINE 21 twice successively, whereby the closed caption 3 and 4 (CC3, CC4) stored in the non-display memory of the display 30 are erased. That is, the closed captions 3 and 4 (CC3, CC4) to be next displayed are erased and nothing is output from the non-display memory to the display memory. Accordingly, the closed captions 3 and 4 (CC3, CC4) are not displayed on the screen.

The erase signal is thus output, whereby the closed captions on the display screen are erased reliably and later no closed caption is displayed until a menu screen is erased.

Due to the above operation, the closed caption can be prevented from overlapping with the menu image on the screen of the display.

In the embodiment, the digital broadcast receiving apparatus which does not output the analog broadcast closed caption contained in the digital broadcast signal during outputting the menu screen for setting the apparatus main unit is shown, but the invention can also be applied to the digital broadcast receiving apparatus that can down-convert digital broadcast caption service data contained in the digital broadcast signal into the analog closed caption signal and output the analog closed caption signal.

To output the digital broadcast caption service data contained in the digital broadcast signal to the analog display, the closed caption information contained in the digital broadcast caption service data is converted into the analog closed caption signal by a decoder. The provided closed caption signal can be applied as it is subjected to similar processing to that of the analog broadcast closed caption signal in the description given above.

Figure 4:
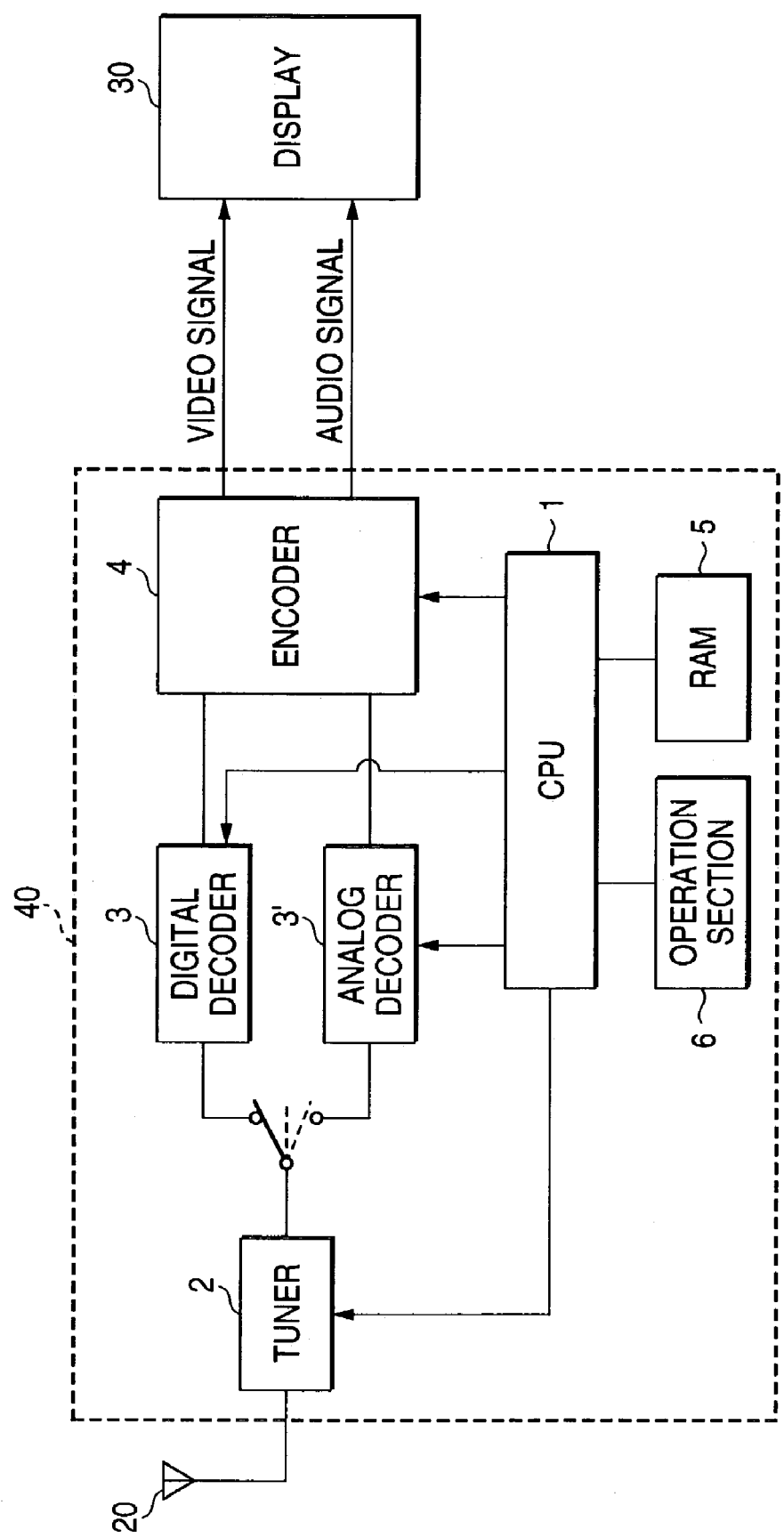
FIG. 4 is a block diagram to show the main part of a digital broadcast/analog broadcast receiving apparatus.
Figure 5:
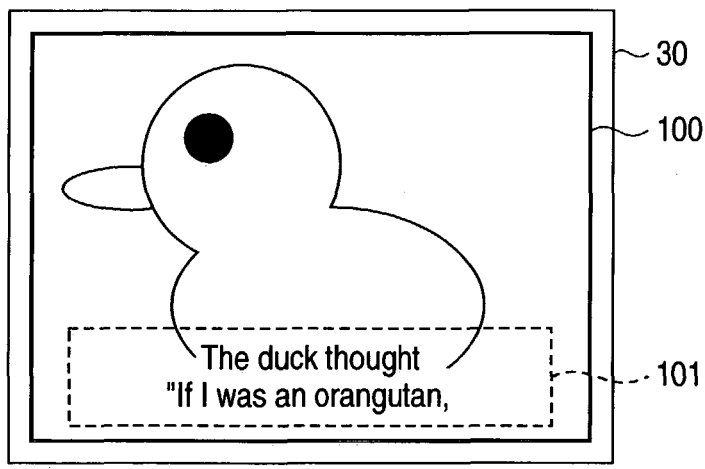
FIG. 5 is a drawing to show a state in which a closed caption is displayed on program video.
Figure 6:
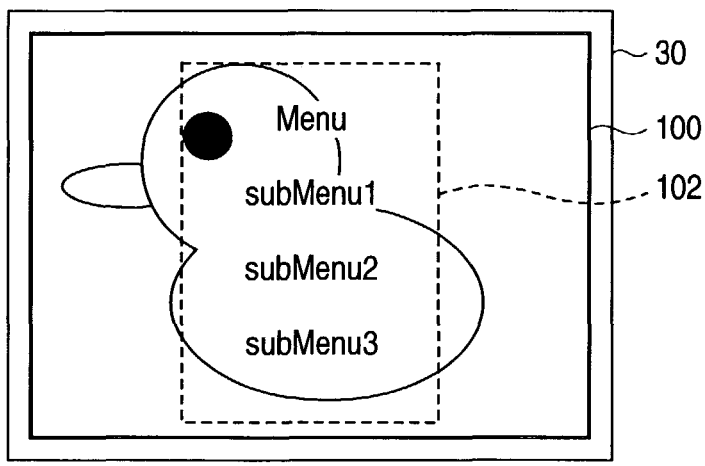
FIG. 6 is a drawing to show a state in which a menu screen is displayed on program video.
Figure 7:
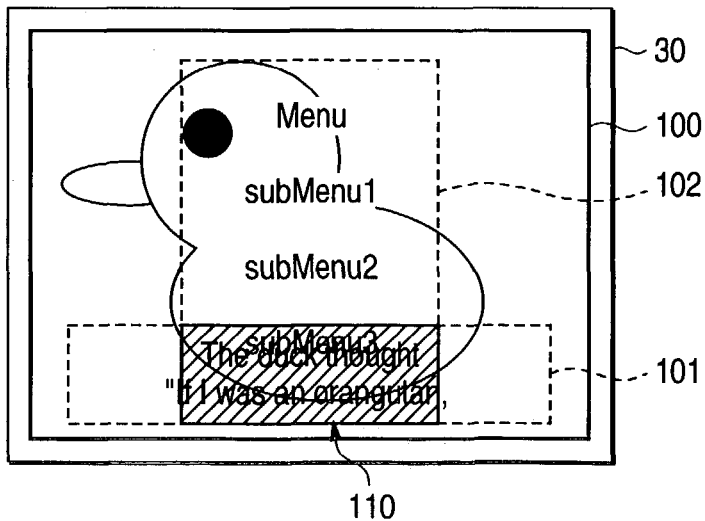
FIG. 7 is a drawing to show a state in which a closed caption and a menu screen are displayed on program video at the same time.

In the embodiment, the digital broadcast receiving apparatus for receiving only digital broadcast signals is described, but the invention can also be applied to a digital broadcast/analog broadcast receiving apparatus that can also receive analog broadcasts, as shown in FIG. 4.

In a digital broadcast/analog broadcast receiving apparatus 40 shown in FIG. 4, when the broadcast wave of the selected channel is the digital broadcast, the tuner 2 inputs the digital broadcast signal received at the antenna 20 and outputs the digital signal of the selected channel. The output digital signal is subjected to similar processing to that in the digital broadcast receiving apparatus previously described with reference to FIG. 1, and is output to the display 30. On the other hand, when the selected channel is the analog broadcast, the tuner 2 extracts the analog signal of the selected channel and outputs the analog signal to an analog decoder 3'. The analog decoder 3' demultiplexes the analog signal into the video signal, the audio signal, and the closed caption signal and outputs the video signal and the audio signal to the encoder 4.

The closed caption signal provided by converting digital broadcast caption service data, the analog broadcast closed caption signal contained in the digital broadcast, and the closed caption signal of the analog broadcast are input to the CPU 1, which then analyzes the signals and stores the signals in the memory 5. The CPU 1 reads the closed caption signal stored in the memory 5 and outputs the closed caption signal to the encoder 4 for inserting the closed caption signal into LINE 21 of the video signal. When the menu image signal is output, control is performed so that the closed caption signal is not inserted into LINE 21 of the video signal.

Thus, the digital broadcast/analog broadcast receiving apparatus can suppress output of the digital broadcast caption service data and the analog broadcast closed caption signal contained in the digital broadcast signal and the closed caption signal contained in the analog broadcast signal during outputting of the menu image signal.

In the digital broadcast receiving apparatus according to the embodiment of the invention, when the menu image is output, the control section (CPU) does not insert the closed caption signal into LINE 21 (predetermined scanning line) of the video signal. Accordingly, while the menu image is output, the closed caption signal is not output, so that no closed caption is displayed on the display screen and only program video and the menu screen are displayed.

When the viewer operates the operation section so as to display the menu screen for changing the setting of the apparatus main unit, the CPU inserts the erase signal for erasing the already output closed caption into LINE 21 of the video signal. Accordingly, the closed caption already displayed on the display screen is erased reliably, and later only the video signal and the menu image superposed thereon are output and only program video and the setting menu screen are displayed on the display.

Accordingly, the menu screen and the closed caption are prevented from overlapping each other and to change the setting of the apparatus, the viewer can reliably see the apparatus setting menu screen.

Although the present invention has been shown and described with reference to the specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A digital broadcast receiving apparatus comprising:
    a receive section adapted to receive a digital broadcast signal of a selected channel;
    a convert section adapted to convert the digital broadcast signal into a video signal of an analog mode and to extract a closed caption signal from the digital broadcast signal;
    a multiplex section adapted to multiplex the closed caption signal in the video signal and to output the video signal in which the closed caption signal is multiplexed; and
    a control section adapted to control a superpose process of a configuration menu image,
    wherein when the configuration menu image is superposed on the video signal, the control section prohibits inserting the closed caption signal in a predetermined scanning line of the video signal, thereby limiting multiplexing of the closed caption signal in the video signal, and inserts an erase signal for erasing a previously output closed caption into the predetermined scanning line of the video signal.

2. A digital broadcast receiving apparatus, comprising:
    a receive section adapted to receive a digital broadcast signal of a selected channel;
    a convert section adapted to convert the digital broadcast signal into a video signal of an analog mode and to extract a closed caption signal from the digital broadcast signal;
    a multiplex section adapted to multiplex the closed caption signal in the video signal and to output the video signal in which the closed caption signal is multiplexed; and
    a control section adapted to control a superpose process of a configuration menu image,
    wherein when the configuration menu image is superposed on the video signal, the control section limits multiplexing of the closed caption signal in the video signal, and
    wherein the control section inserts an erase signal for erasing a previously output closed caption into a predetermined scanning line of the video signal.

* * * * *